J. F. Brouard.
Sails & Rigging.
N° 24,370. Patented Jun. 14, 1859.

Witnesses
Inventor

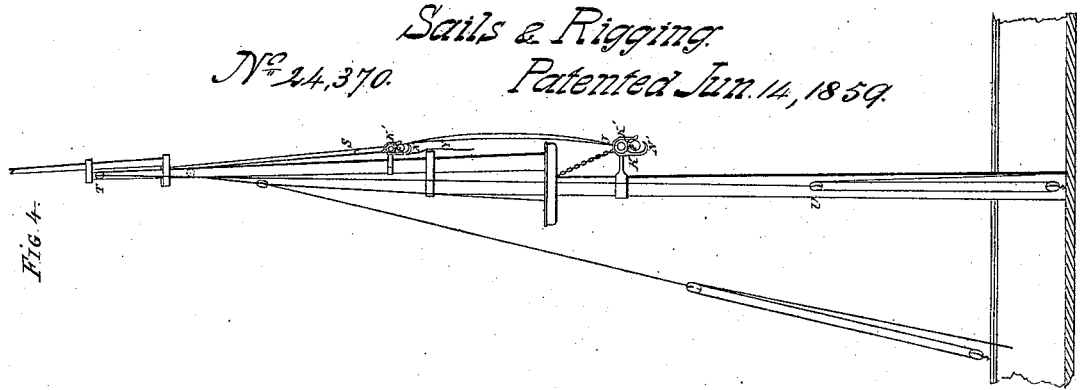
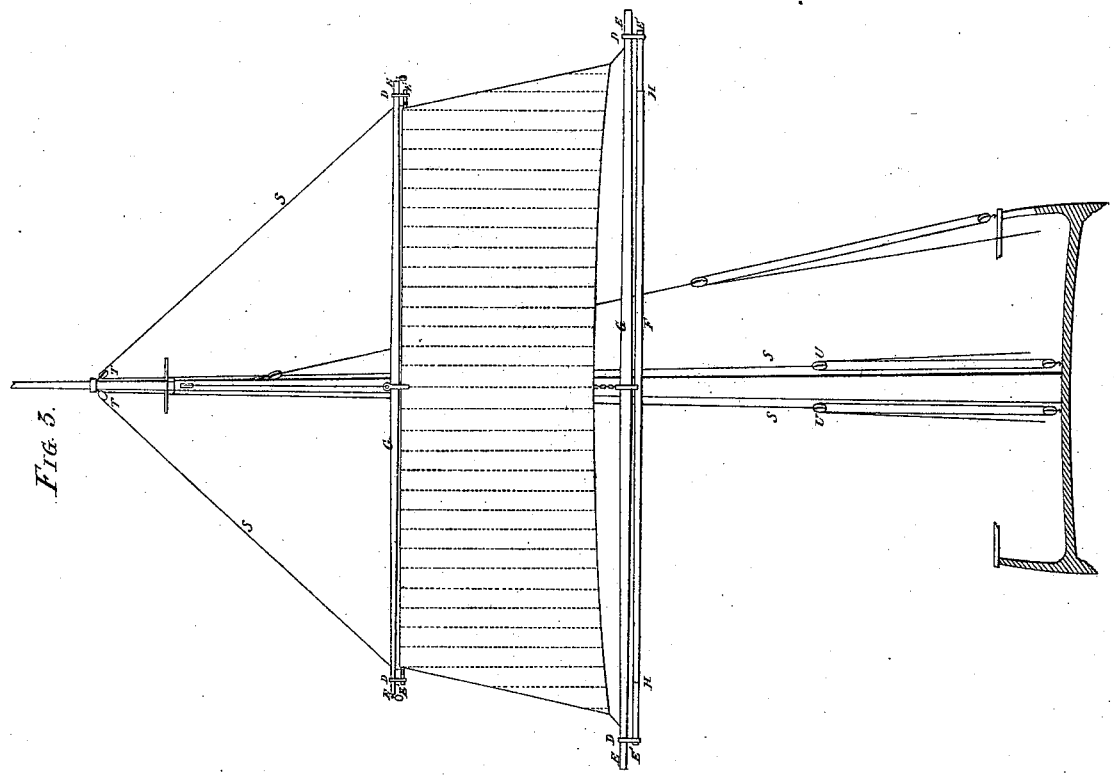

Sheet 3, 4 Sheets.
J. F. Brouard.
Sails & Rigging.
N° 24,370. Patented Jun. 14, 1859.
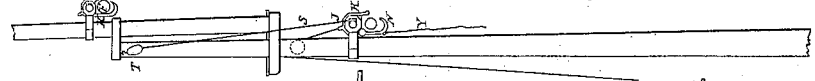
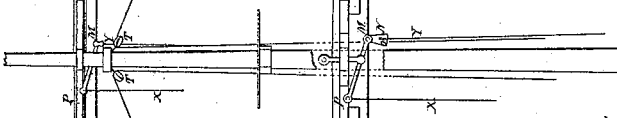
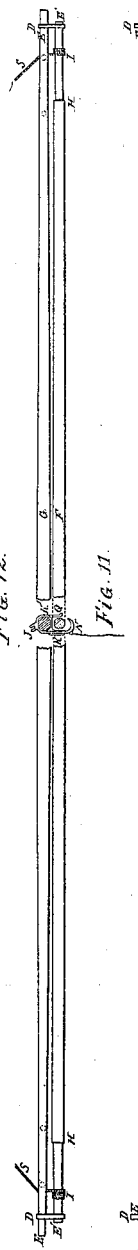
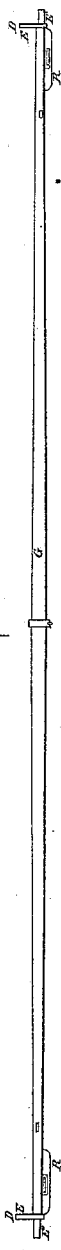
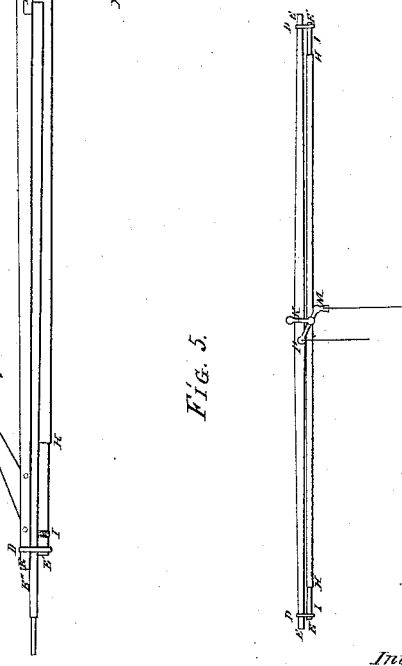
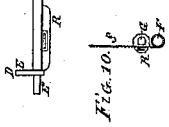
Witnesses
Inventor

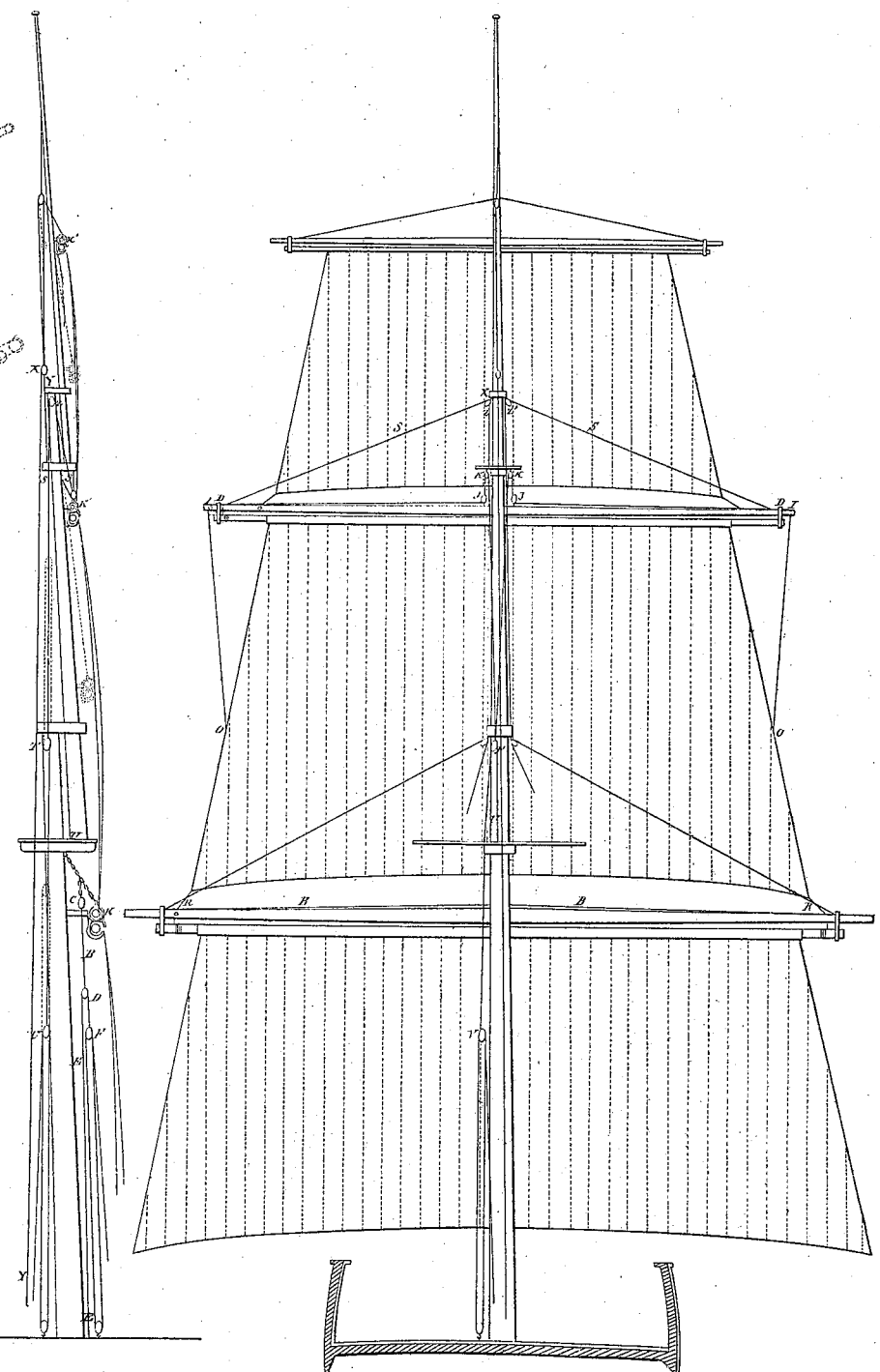

UNITED STATES PATENT OFFICE.

JOSEPH FRANÇOIS BROUARD, OF HÂVRE DE GRACE, FRANCE.

REEFING SAILS.

Specification of Letters Patent No. 24,370, dated June 14, 1859.

*To all whom it may concern:*

Be it known that I, JOSEPH FRANÇOIS BROUARD, of Hâvre de Grace, in the Empire of France, a subject of His Majesty Napoleon III, have invented or discovered certain new and useful Improvements in Reefing or Furling the Sails of Ships or Vessels; and I do hereby declare that the following is a full and exact description thereof, reference being had to the accompanying drawings and to the letters of reference marked thereon.

My invention relates to improvements in the method of reefing and furling the lower sails, topsails, and top gallant sails of vessels, by the adoption of which improvements, the use of reef points, tablings, and bolt ropes are dispensed with, and the cutting of the sails in the middle rendered unnecessary.

The improvements consist, first, of a boom iron fixed to the upper yard and boom. To this boom iron is fixed an additional hoop in which the lower yard upon which the sail is reefed rotates. Secondly, of a new form of truss hoop, furnished with a hook, for sustaining and strengthening the lower rotating yard in the middle. Thirdly, in the peculiar arrangement of pulley blocks and tackle for reefing the said sails, thereby requiring fewer hands to work them.

The same letters in the accompanying drawings represent (as above noted) the same parts.

Figure 2:
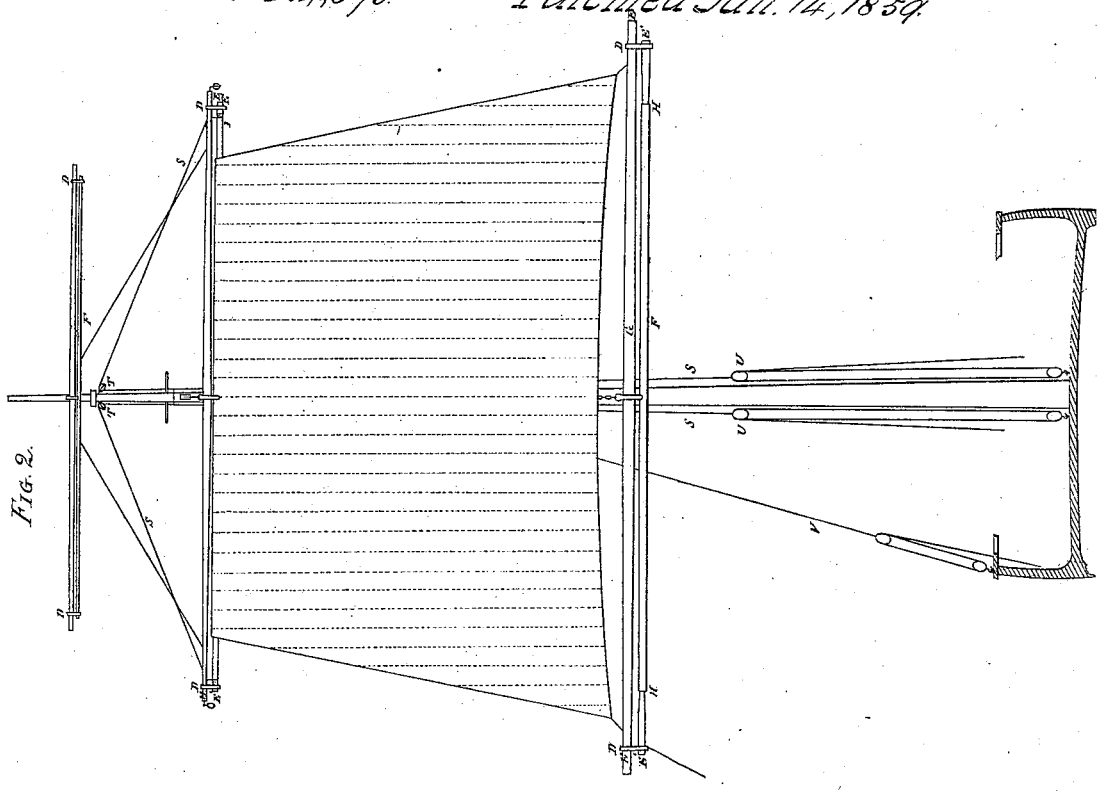
Figure 1:
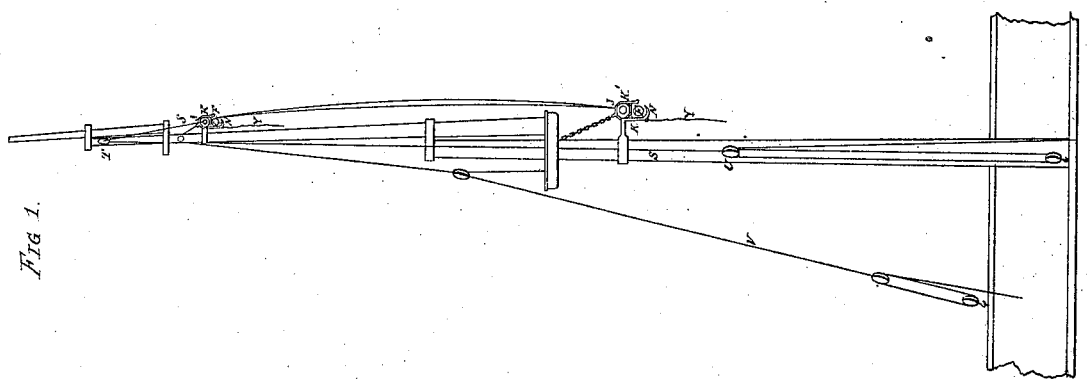

Figure 1, Sheet 1, is a side view of a mast with the improved tackle and truss hoop and hook attached. Fig. 2, is a side view of the same, showing the sail unfurled. Fig. 3, Sheet 2, is a front view of the sail partly reefed. Fig. 4 a side view of the same. Figs. 5 and 6, Sheet 3, front view and plan of the topsail yard showing the mode of attaching it to the mast. Fig. 7, detail view, representing the main yard, lower rotating yard, and boom, attached to the boom iron, also the lever and tackle for putting the hook in and out of gear. Fig. 8, is a side view of the same; Fig. 9, side view of the boom iron, with the additional hook; Fig. 10, end view of the upper and lower yard; Fig. 11, plan of the main yard; Fig. 12, front view of the same, also the lower reefing yard, together with an end view of the same fixed in the truss hoop. Fig. 1, Sheet 4, represents a side view of a foremast, foretop mast and foretop-gallant mast with the improved tackle, pulleys, blocks and truss hoops attached. Fig. 2, is a front view of the same showing the foresail, foretop sail and foretop gallant sails spread and bent to their respective yards; Figs. 3 and 4, front and side views of a modification of the truss with the supporting hook.

In carrying out this invention, a boom iron Fig. 9 is formed with an extra hoop. The hoop E is firmly fixed about 20 inches from each end of the upper yards G Fig. 12. In the lower hoop E′ the two ends of the lower reefing yards F, are made to rotate and to the third hoop E″ is fixed the boom Z, Fig. 7. The latter hoop is placed at the back of the yards to preserve the sail from rubbing against the shrouds when the ship is close hauled. The width of the sail is regulated by the length of the cylindrical part of the lower reefing yard which at the ends H, are made conical and cased with iron to protect them from wear. The lower yard F is supported, strengthened, and kept in a horizontal position by a hook N, on the truss hoop J fixed to the "parral" which surrounds the mast. The truss hoop J supports the upper yard G. From this hoop project two arms K K′. To one is fixed a jointed lever P Fig. 7 and the other K′ is provided with a hard wood roller Q, Fig. 12. To the long arm of the lever is attached a tackle rope X, descending to the deck and to the short arm M of the lever, Fig. 7 is a hook N, furnished with a hinge or joint, and an eye O, to which is fastened a line V, for putting the hook in and out of action. This hook supports the yard, and strengthens it when the sail receives the wind. The inside of the hook is made flat, and smooth; it is one third the size of the yard with the sail reefed and its strength is in proportion to the same.

A modification of the above truss iron hoop consists of a hoop, Figs. 3 and 4, Sheet 4, firmly fixed to the upper yard. To the hoop is attached a hook G which in this case is stationary. Two of these hooked trusses are placed at suitable distances apart on the yard and are connected together at the top by an iron piece M, M². At the bottom, a pin, I, upon which a roller of lignum vitæ or other hard substance works, may be fixed to the hooks of the upper masts. Between the two hooks and secured to the mast and top connecting piece of iron is a movable safety arm L, provided with a joint or hinge which is made to lift up when the lower rotating yard is to be introduced. To lessen the friction of this yard when in motion three small lignum vitæ pulleys H H H are fixed at the bottom of each hook, and two upon the safety arm. The rotation of the lower yard is effected by means of the lifts S, Figs. 2, 3, 7, 10 and 12, which pass around the lower reefing yard at the part I, a sufficient number of times.

To ascertain the number of revolutions of the lifts on the yard, divide the length of the sail to be reefed by the circumference of the yard; the quotient will show the number to which is added one and a half revolutions to have the lifts rather rolled and tangented to the yard.

For the reefing and furling of the topsails, a lift passes through the two pulley blocks T Figs. 2, 3, 7, fixed to the under part of the cap of the top mast, and at the mast head, and descends to the deck, the sails being at the same time struck on the tenon without being furled. The top sails are also provided with double tackle, U, Figs. 1, 2, 3, 4. This tackle is fixed by an eye bolt in the deck. The double tackle at the end of the runner must be placed at the height of the deck. The parallel position of the tackles will determine the horizontal position of the yard. For the top gallant sails, the simple tackle is placed at about four feet above the shrouds of the mast. Upon the sail being bent to its lower yard, and brought to the tenon, if it is hoisted by means of the halyard it will be necessary to weigh on the lift at the same time, in order to keep them always stretched. When the sail is raised to its proper elevation the halyard is turned, and the suspension tackle fixed by its tie, X on the long arm of the lever P, Fig. 7, is hauled taut. This causes the hook N to take hold of the lower yard and support it in the middle. When it is necessary to reef the top sail, the lifts S Figs. 1, 2 and 7, are pulled taut, and turned, the halyard and tackle V of the sail are veered out, and the haul line X is pulled to separate the supporting hook from the yard. The weight of the yards which are held by the lifts compels the lower yard to turn promptly, and that rotatory motion coils the sail which is then reefed. If the sail is not sufficiently stretched it is necessary to weigh over the ties to stretch it.

For the lower sails the yards must be disposed as those of the top sails and supported in the same manner. As it is necessary sometimes to pay out more ties to the lifts, ties are added about four feet above the clamps and a piece of chain of the required length for the reefing of the sail. The end of the chain is fixed to the lower sail. The lower sails are reefed by means of reef tackle, Fig. 1, Sheet 4. Two pulley blocks C, are fixed to the main and fore tackle pendants of the lower yard and are level with it. A length of rope, Figs. 1 and 2, B, is then taken according to the dimensions of the sail, and having twice the length of the yard. In the middle a pulley block D, is strapped. In each pulley of the pendant of the yard one end of the rope is passed going to the larboard and the other to the starboard prolonging it at the same time on the lower yard up to the cleat R, Fig. 2, into which each end of the rope will pass and afterward coil the lower yard as much as is necessary to reef the lower sail, and to which these ends are fastened as before described. By this arrangement the pulley D, Fig. 1, fixed in the middle of that rope which becomes a reef tackle tie, is suspended under the lower yard against the lower mast. The end of the rope E, Fig. 1, is passed through the above pulley and descends on deck. At the end of the rope against another pulley F two pulley blocks are strapped to make a tackle which will also reach the deck. In working that tackle the two ends of the reef tackle ties, are stretched at the same time; this action alone determines the turning of the lower yard and consequently the reefing of the sail as much as is required. By this operation, the original lifts of the lower yards are used as before. It is therefore unnecessary to send a man to each end of the yard to pass a bolt through the large meshes of the chain lifts and their suppression leaves only one more operation to perform.

For reefing and furling the top sails the lifts S are united to the top of the block of the lower mast. A single pulley T, Fig. 1, is fixed to this point in which one end of the rope is introduced which forms a rest in the cross trees U, Figs. 1 and 2, and the other end is fixed to the two pulley blocks V, Fig. 1, which form a tackle with a single pulley on deck; by this means a tackle block is suppressed. The two lifts united work more regularly and the working is rendered more simple and prompt by employing fewer hands on deck.

For the reefing of the top gallant sails, the lifts are united to the top of the cross trees X, Figs. 1 and 2 of the mast. A single pulley is fixed at this point, one end of the rope Y is passed through the pulley block and forms a rest in the cross trees of the top gallant mast; the other end descends on deck, and being arranged accordingly suffices for the reefing of the sail. In this new mode of reefing the sails, to obviate the inconvenience of the flapping of the sail in the inside the pulleys Z', Fig. 2, Sheet 4 is employed. When the topsail descends to the height of the lower reefs, the sides remain constantly stretched and the wind cannot enter inside. The ends of the tackle O, Fig. 2, Sheet 4, are fixed in the ordinary way. They afterward pass in a sheave hole I, at the end of the yard and through a small pulley block J, Fig. 2, fixed on the same yard. From there they pass through a small pulley K, Fig. 1, fixed under the cross trees and descend to belay the beam of the sail Fig. 2, Sheet 4.

Having now described the nature of the said invention, and the manner in which it may be carried out I would have it understood that I do not confine myself to the precise details herein laid down, as many variations may be made, without deviating from the general principle. But—

What I claim and wish to be secured by Letters Patent is:

1. Supporting the rolling yard F, (Fig. 12, Sheet No. 3) between its points of suspension, by the hook N, the said hook being constructed and operated as described; for the purpose of staying the rolling yard and holding it in position when the sail attached to it is acted upon by the wind, as herein set forth.

2. The construction of the boom iron shown in Fig. 9, Sheet No. 3, for the purpose of placing the boom in position to prevent the chafing of the sail, as described.

JOS. F. BROUARD.

Witnesses:
HANSEUR CONTANT,
T. V. AMAURY.